United States Patent [19]

Smith

[11] 4,418,035
[45] Nov. 29, 1983

[54] COOLANT CONDITION MONITOR FOR NUCLEAR POWER REACTOR

[75] Inventor: Robert D. Smith, Bethesda, Md.

[73] Assignee: Scandpower, Inc., Bethesda, Md.

[21] Appl. No.: 267,541

[22] Filed: May 27, 1981

[51] Int. Cl.³ .............................................. G21C 17/00
[52] U.S. Cl. ..................................... 376/247; 376/258
[58] Field of Search ............. 376/247, 258; 73/295 R

[56] References Cited

U.S. PATENT DOCUMENTS

| | | | |
|---|---|---|---|
| 3,280,627 | 10/1966 | Cousins et al. | 73/295 |
| 4,053,874 | 10/1977 | Glaser | 73/295 |
| 4,298,430 | 11/1981 | Rolstad et al. | 376/247 |
| 4,320,656 | 3/1982 | Tiskus | 73/295 |

FOREIGN PATENT DOCUMENTS 2069136  8/1981  United Kingdom ................. 73/295

Primary Examiner—Sal Cangialosi
Attorney, Agent, or Firm—Eric P. Schellin

[57] ABSTRACT

The faster acting junction of a difference junction thermocouple associated with a gamma sensor is located vertically above the other junction to ordinarily monitor local power generation in the fuel core of a nuclear reactor and in response to a reversal in the signal voltage polarity indicate a drop in level of coolant to thereby also function as a coolant monitor. An internal electrical heater enhances the coolant monitoring capability of the sensor, which may also be extended into the dome of the reactor vessel for monitoring conditions therein.

19 Claims, 8 Drawing Figures

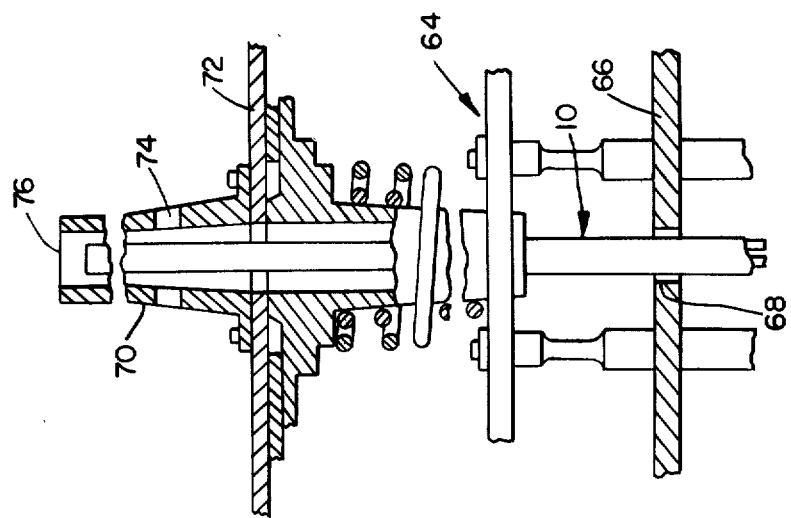
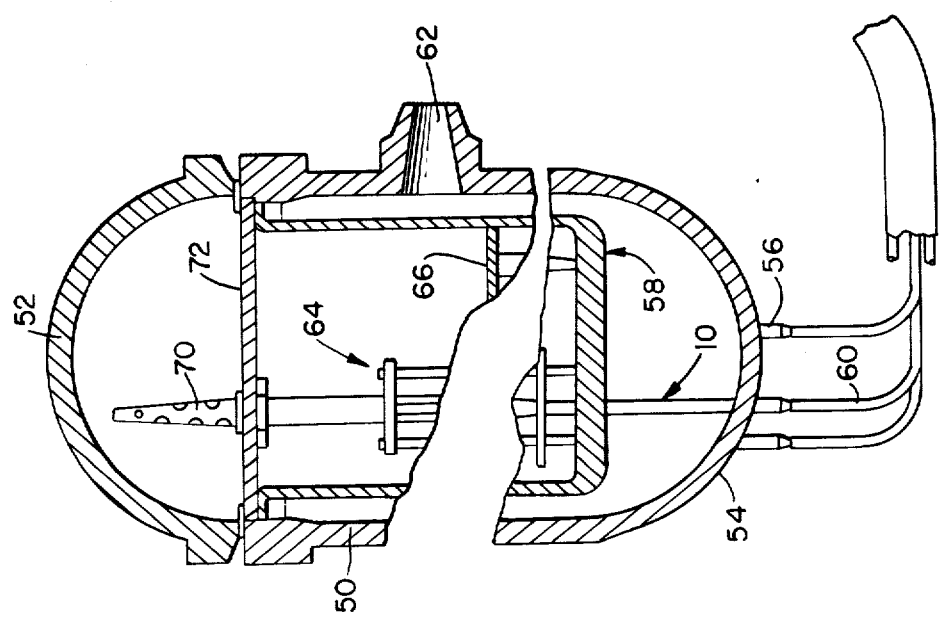

COOLANT CONDITION MONITOR FOR NUCLEAR POWER REACTOR

BACKGROUND OF THE INVENTION

This invention relates in general to monitoring of the cooling action and condition of coolant in a nuclear power reactor.

A required safety measure for operation of nuclear power plants involves detection of coolant level in the reactor fuel core, to provide warnings of dangerous coolant loss. The installation of measuring and monitoring systems for such purposes is regarded as very costly because of equipment costs and modification of reactor design to accommodate such equipment.

Further, providing only coolant level information is sometimes insufficient for recognition of inadequate fuel core cooling caused by significant reactor malfunction such as high void fraction-pumped flow and stagnant boil off. On the other hand, non-significant coolant loss detection must be avoided to prevent unnecessary and wasteful power plant shutdowns.

It is, therefore, an important object of the present invention to monitor coolant conditions in an economically feasible and meaningful manner.

An additional object is to provide advanced warnings of inadequate fuel core cooling by a monitoring system covering a full range of operation.

SUMMARY OF THE INVENTION

In accordance with one embodiment of the present invention, loss of coolant in the fuel core of a nuclear reactor may be detected through a simple rearrangement of local power rate sensors of the type disclosed in prior application Ser. No. 888,881 filed Mar. 21, 1979, now U.S. Pat. No. 4,298,430 owned in common with the present application by the same assignee. In this type of sensor, the gamma radiation heated sensor body is designed to exhibit a varying temperature distribution because of heat transfer to the coolant within the fuel core. Such sensors include double junction thermocouples at each of a plurality of vertically spaced local measurement zones. The tip portion of the thermocouple at which the faster acting junction is located, is vertically positioned above the other junction so that the faster acting junction normally acts as the cold junction spaced above the hot region of the sensor core as long as reactor coolant is in thermal contact with the sensor throughout. When a drop in coolant level occurs below the faster acting junction, however, the faster acting junction then acts as the hot junction. Thus, depletion of the coolant manifested by a drop in coolant level below the faster acting junction will produce a reversal in polarity of the differential signal voltage across the junctions. Such a reversal in polarity may be used to trigger an alarm or initiate an action sequence in the event of a reactor accident resulting in coolant loss.

In accordance with another embodiment of the invention, an electrical heating device is embedded within the sensor body amongst the double junction thermocouples to increase the level of internal heating above that produced by gamma radiation. The level detection operation is thereby enhanced and data obtained by the signal output of the sensors for determining the heat transfer characteristics of the external surface of the sensors at critical levels.

An important aspect of the invention resides in the aforementioned modification of gamma sensors so as to render them operative for multiple function monitoring purposes, including the monitoring of coolant level, determination of heat transfer coefficients, and temperature surveillance as well as to monitor local power distribution. The advantages and benefits of the invention are further enlarged by extension of the sensors into the upper dome of a nuclear reactor vessel in order to monitor coolant conditions within the dome. An economical system may thereby be designed for providing safety monitoring facilities based on existing sensors for monitoring local power distribution.

BRIEF DESCRIPTION OF DRAWING FIGURES

FIG. 4 is a simplified, partial section view of a nuclear reactor installation for the sensor shown in FIGS. 1 and 3.

FIG. 5 is an enlarged section view through a portion of the installation shown in FIG. 4.

DETAILED DESCRIPTION OF PREFERRED EMBODIMENT

Figure 1:
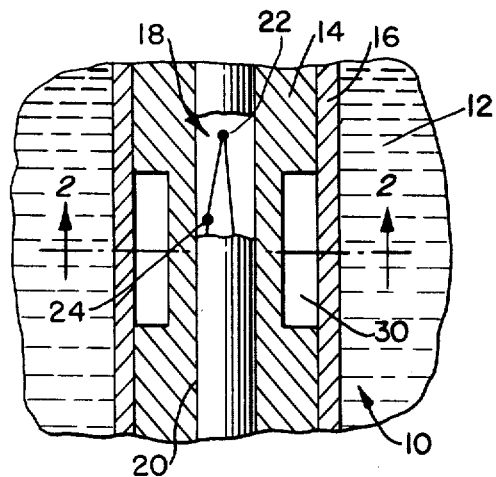
FIG. 1 is a partial section view of a gamma sensor installation arranged to provide an indication of coolant loss, shown in a normal operating mode.
Figure 3:
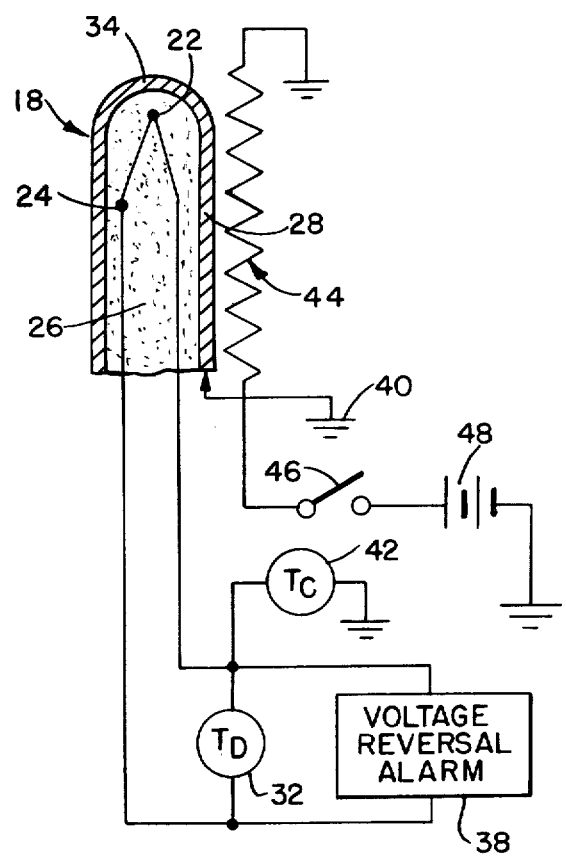
FIG. 3 is an electrical circuit diagram associated with one thermocouple device associated with the sensor shown in FIG. 1.

Referring now to the drawings in detail, FIGS. 1 and 3 illustrate a gamma sensor of the type disclosed in the aforementioned prior application, generally referred to herein by reference numeral 10. The sensor is shown in FIG. 1 within a nuclear reactor fuel core surrounded by a body of reactor coolant 12.

The sensor includes an elongated heated body 14 that extends vertically through a fuel core, and is enclosed by an outer sheath 16 establishing thermal contact with coolant to form a radially outer heat sink to which radial heat flow paths extend when the body is internally heated by gamma radiation during power generation except at spaced regions in each measurement zone at which thermal resistance gaps 30 are located. In such regions, radial heat flow is inhibited to produce the varying temperature distribution. The sensor thereby measures heat flow rate which is directly related to local power generated at a plurality of vertically spaced measurement zones, one of which is shown in FIG. 1. The local heat rate measurement is effected by multiple junction thermocouples 18 at each of the measurement zones positioned within a central bore 20 of the heated body. As more clearly seen in FIG. 3, each thermocouple includes a pair of junctions 22 and 24 interconnected in series and embedded in an insulating medium 26, such as aluminum oxide enclosed within stainless steel cladding 28. The spaced junctions as shown in FIG. 1 are axially positioned adjacent to the thermal resistance gap 30 formed in the heated body at each measurement zone. Referring once again to FIG. 3, the junctions are electrically connected across a voltmeter 32 forming part of external instrumentation in order to register a differential temperature signal voltage reflecting the local heat rate or power developed at adjacent fuel rods.

In accordance with the present invention, the thermocouple device 18 is positioned with its tip portion 34 and the faster responding junction 22 thereat vertically above the other junction 24. This is an inversion of the vertical thermocouple arrangement heretofore associated with gamma sensors as disclosed in the prior copending application aforementioned. Ordinarily, the reversal in location of junctions has little effect on normal operation of the thermocouple in measuring local power generation with the junction 22 acting as the cold junction while the junction 24 is the hot junction located in the hot region axially coextensive with the thermal resistance gap 30. Normal operation is based on the presence of coolant 12 continuously along the vertical length of the sensor establishing a uniform heat sink temperature for the outer sheath 16. The signal voltage exhibited at the voltmeter 32 will then be of a positive polarity.

Figure 1A:
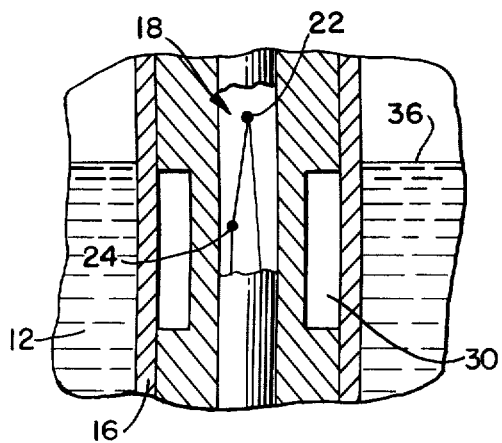
FIGS. 1A and 1B are views similar to that of FIG. 1 showing operation in alarm modes indicating coolant loss.
Figure 1B:
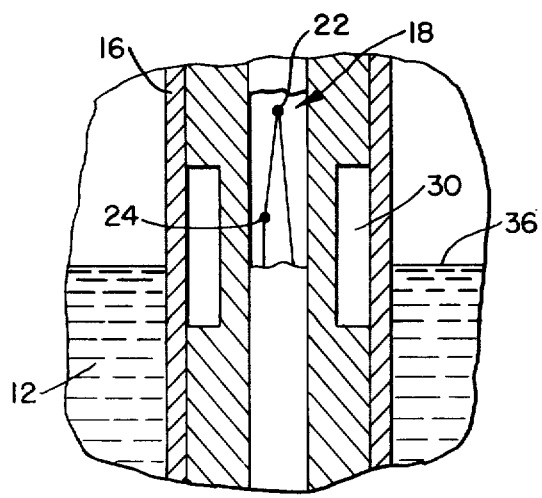

As a result of certain reactor malfunctions producing a loss of coolant, depletion in the body of coolant 12 causes a drop in coolant level 36 as shown in FIGS. 1A and 1B. When the coolant level drops below the upper faster responding junction 22 as shown in FIG. 1A, the region of the heated body 14 above the coolant level becomes hot relative to the region therebelow producing a reversal in polarity of the signal voltage exhibited at voltmeter 32. Such a reversal of signal voltage polarity would not occur if the thermocouple were inverted as in the arrangements heretofore utilized. The polarity reversal may therefore be utilized to trigger an alarm 38 or initiate an action sequence in order to cope with a reactor accident involving a loss of coolant.

Figure 2:
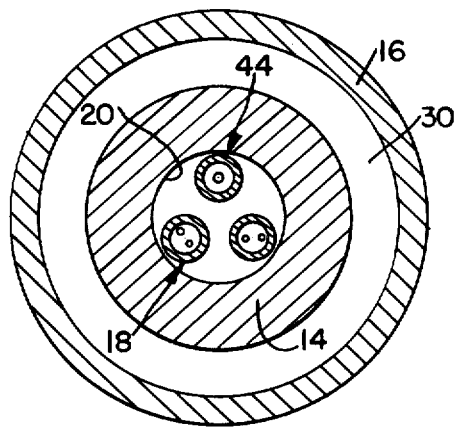
FIG. 2 is a transverse section view taken substantially through a plane indicated by section line 2—2 in FIG. 1.

As shown in FIG. 3, the thermocouple cladding 28 is grounded at 40 in order to permit measurement of absolute sensor temperature during accidents, by means of a grounded voltmeter 42 electrically connected to junction 22. Further, the temperature readings of the voltmeters may be increased by electrical heating of the body 14 through a heater device 44 connected through switch 46 to an external source of heating current 48. The heater device is of the type disclosed in copending application Ser. No. 888,881, filed Sept. 28, 1978, serving an in-situ calibration purpose. As shown in FIG. 2, the heater device may be located within the bore 20 of heated body 14 amongst the thermocouples 18 for selectively providing additional electrical heating at all of the measurement zones served by the respective thermocouples 18 associated with each sensor. As will be explained further hereinafter, the heater device 44 not only enhances detection of a drop in coolant level, but also enables determination of heat transfer conditions at the external surfaces of the sensor 10.

By way of example, FIG. 4 illustrates a typical nuclear reactor vessel 50 having a dome 52 at its upper end and a bottom 54 into which vessel penetration tubes 56 extend. The tubes 56 support various instruments such as sensors 10 hereinbefore described inserted through the bottom of the vessel into the fuel core 58 positioned within the vessel below the dome 52. The sensors are connected through cables 60 to a remote external instrument panel site as is well known in the art. Further, the vessel is provided with inlet or outlet nozzles 62 through which it is maintained filled with a liquid coolant such as water. The fuel core 58 is exposed to the coolant, and the coolant extends up into the dome 52.

In accordance with the present invention, one or more of the sensors 10 extends vertically from the fuel core up into the dome so as to monitor heat transfer conditions of the coolant therein, including coolant level. The sensors also continue monitoring local power generation within the fuel core. Support and guidance for the vertically extended sensors may be provided by the thimble plug assembly 64 also already known in the art. Such plug assemblies are utilized to plug or close unused openings in the upper core plate 66 of the fuel core, except for a central opening 68 in the plate through which a sensor 10 extends pursuant to the present invention as more clearly seen in FIG. 5. An extension tube 70 is secured to the upper support plate 72 which ordinarily separates the dome 52 from the main vessel chamber above the fuel core. The tube 70 protectively encloses the vertically extended portion of sensor 10 within the dome and is accordingly aligned with the plug assembly. Also, the tube 70 is provided with openings 74 and an open upper end 76 in order to permit full exposure of the sensor to the coolant while protecting the sensor against deflecting forces generated by coolant movement.

As hereinbefore pointed out, selective energization of the heater 44 associated with sensor 10 enhances the multiple monitoring functions of the sensor. By way of example, a sensor body 14 internally heated by gamma radiation at a heating rate of 0.075 BTU/gm. under normal reactor operation reflected in FIG. 1, will produce a differential signal temperature (TD) across the junctions 22 and 24 of approximately 2° C. as measured by voltmeter 32. The absolute temperature of the sensor (TC) under such conditions without energization of heater 44 as measured by voltmeter 42, will be close to the coolant temperature (TW). With the heater 44 energized under normal operation, the heating rate of body 14 is increased to 3.075 BTU/gm. and the differential temperature (TD) increases to approximately 80° C. as expected. However, the increase ($\Delta T$) in absolute sensor temperature (TC) is relatively small such as 5°-10° C., confirming that good cooling heat transfer exists.

When the liquid coolant level 36 drops below the cold junction 22 as shown in FIG. 1A, the sensor at the level of junction 22 will be exposed to steam or a steam-hydrogen environment while the sensor at the level of junction 24 remains covered with liquid coolant. Such degraded cooling at the level of upper junction 22 disturbs the symmetrical heat flow pattern within body 14 to effect a reversal in polarity of the differential temperature (TD) of approximately $-2°$ C. without additional heating by heater 44. The absolute sensor temperature (TC) on the other hand will be elevated above coolant temperature (TW) by an amount ($\Delta T$) of approximately 2° C. because of the poor heat transfer surface in the steam environment. A clearer indication of coolant loss sufficient to trigger alarm 38, for example, will be provided by energization of heater 44 resulting in a reversed polarity temperature difference (TD) of approximately $-50°$ C. while the difference ($\Delta T$) between absolute sensor and coolant temperatures rises to approximately 100° C. Based on an estimated coolant temperature (TW) of 300° C. from earlier measurements, and the absolute sensor temperature (TC), where $\Delta T = TC - TW$, data is available for calculating the heat transfer coefficient at the external surface of the sensor above the liquid coolant level 36 from the known expression $h = Q/\Delta T(A)$, where (h) is the heat transfer coefficient, Q is the heating rate and (A) is the surface area of the sensor.

FIG. 1B illustrates a further drop in coolant level below the lower junction 24. In the latter situation, the differential temperature (TD) is close to zero, whereas the difference ($\Delta T$) between sensor and coolant temperatures is the same as in the situation shown in FIG. 1A with the heat transfer coefficient (ha) above the coolant level considerably lower than the coefficient (hb) below the coolant level. The comparisons between heating modes for the different coolant conditions illustrated in FIGS. 1, 1A and 1B are summarized in the following table:

| COOLANT LEVEL | ELECTRIC HEATER MODE | SENSOR HEATING RATE BTU/gm. | DIFF. SIGNAL TEMP. (TD) °C. | ($\Delta T$) C-TW °C. | Heat Transfer Coeff(h) |
|---|---|---|---|---|---|
| well above | off | 0.075 | 2 | 0 | |
| cold junction (Normal) | on | 3.075 | 80 | 5–10 | $h_b \approx 1000$ |
| between cold and hot junctions | off | 0.075 | −2 | 2 | |
|  | on | 3.075 | −50 | 100 | $h_b < h_a$ $h_b \approx 100$ |
| well below both junctions | off | 0.075 | 0 | 2 | |
|  | on | 3.075 | 0 | >100 | $h_b < h_a$ $h_b < 100$ |

Figure 6:
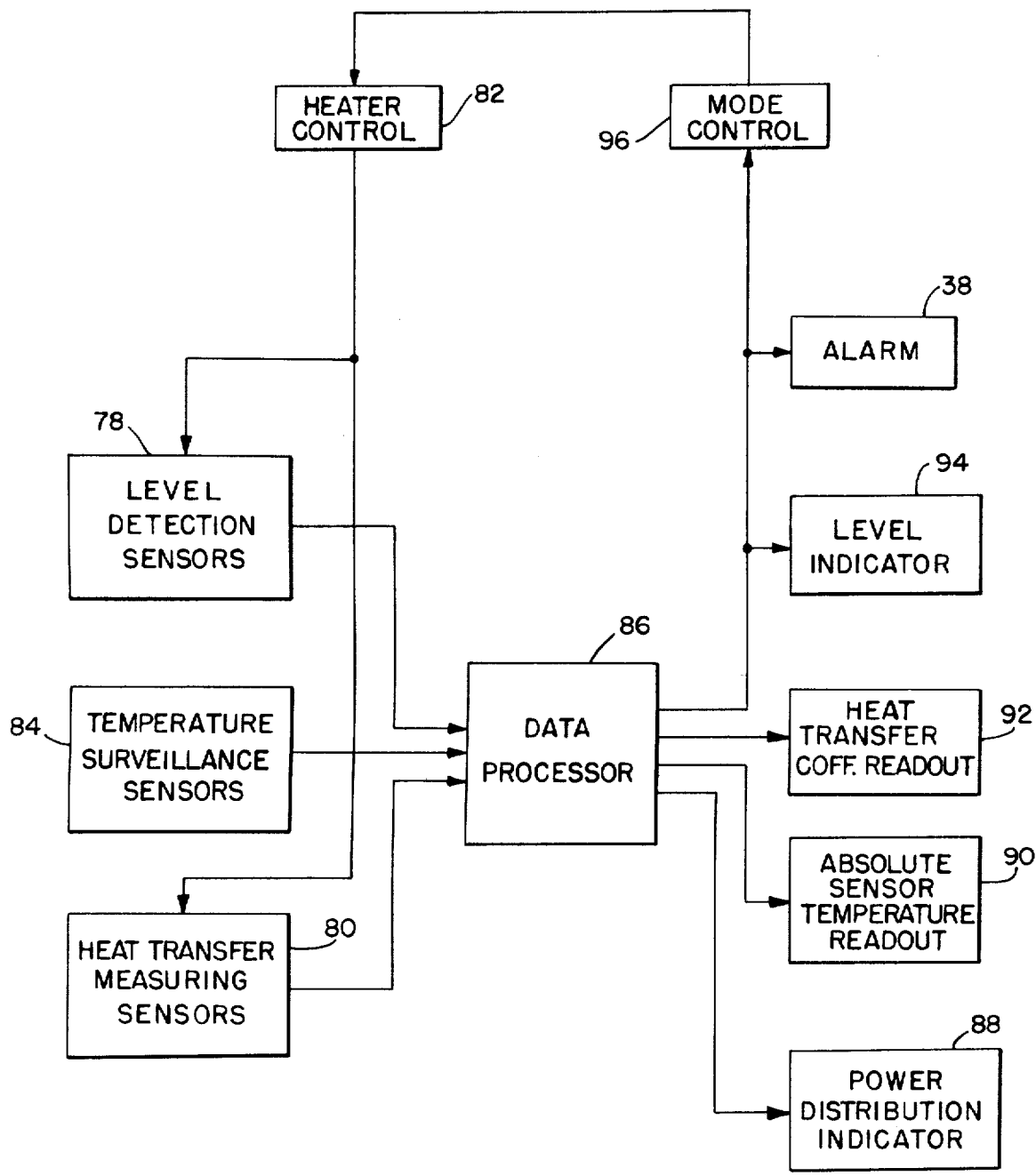
FIG. 6 is a schematic block diagram illustrating a multiple function monitoring system with which sensors of FIGS. 1 and 3 may be associated.

The number of gamma sensors utilized in nuclear reactors for local power monitoring purposes, presently varies between 350 and 450. When such plurality of sensors are modified in accordance with the present invention, they may be allocated in various different ways for multi-function monitoring purposes. FIG. 6 schematically illustrates how such allocation may be utilized to provide a multiple function monitoring system. Variable proportions of the sensors denoted by reference numerals 78 and 80 are respectively assigned to coolant level detection and heat transfer measuring functions by selective energization of the associated electric heaters under control of heater control 82. A fixed proportion of sensors designated 84 may be utilized for temperature surveillance without any electric heating. The signal outputs of all such sensors are fed to a data processor 86 from which power distribution, absolute sensor temperature, heat transfer coefficient and coolant level readouts are obtained at 88, 90, 92 and 94. Through a feedback mode control 96, the proportion of sensors assigned to different measuring functions may be changed. All of the sensors grouped under assignments 78, 80 and 84 may also function to provide the data for the power distribution indicator 88.

I claim:

1. In a nuclear power reactor having a fuel core and a sensor positioned within a body of reactor coolant in thermal contact with an outer sheath of the sensor to establish a heat sink for a body of the sensor internally heated by gamma radiation and having thermal resistance regions formed therein within spaced measurement zones and a thermocouple device extending through said heated body having at least two spaced junctions in each of the measurement zones producing differential signal voltages of one polarity in response to uniform cooling of the outer sheath by the body of coolant in the reactor, the improvement residing in one of the junctions in each of the measurement zones being located vertically above the other of the junctions to produce a differential signal voltage opposite in polarity to said one polarity in response to depletion of the body of reactor coolant to a level below said one of the junctions, and voltage monitoring means connected to the spaced junctions in each of the measurement zones for indicating coolant condition in the reactor.

2. The combination as defined in claim 1 wherein said thermocouple device includes an electrically grounded cladding enclosing the spaced junctions, said voltage monitoring means including first voltage indicating means connected across said spaced junctions for measuring heat flow rate in the heated body and second voltage indicating means connected between ground and said one of the junctions for measuring sensor temperature.

3. The improvement as defined in claim 2 including alarm means connected to the spaced junctions for indicating loss of coolant in response to a polarity reversal of the voltage across said spaced junctions.

4. The improvement as defined in claim 3 wherein said one of the junctions is located in spaced adjacency above the thermal resistance region in each of the measurement zones.

5. The improvement as defined in claim 1 wherein said one of the junctions is located in spaced adjacency above the thermal resistance region in each of the measurement zones.

6. The improvement as defined in claim 1 including electrical heating means embedded within the body for selectively increasing the internal heating thereof.

7. In a nuclear power reactor having a fuel core and a gamma sensor positioned within a body of reactor coolant in thermal contact therewith, said sensor having a thermocouple device provided with spaced junctions and means connected thereto for registering a differential signal voltage, the improvement residing in location of the junctions relative to each other producing a reversal in polarity of the differential signal voltage in response to depletion of the body of coolant to a level below one of the junctions, and means connected to said spaced junctions for monitoring heat transfer conditions externally of the sensor.

8. The improvement as defined in claim 5 wherein said one of the junctions is faster responding than the other of the junctions and is positioned above the other of the junctions.

9. The improvement as defined in claim 8 wherein said sensor includes a thermal resistance region axially aligned with the other of the junctions below the faster responding junction.

10. The improvement as defined in claim 7 wherein said monitoring means includes indicator means for detecting loss of reactor coolant in response to said reversal in polarity of the differential signal voltage.

11. The improvement as defined in claim 7 including electrical heating means embedded in the sensor for selectively increasing the differential signal voltage.

12. In a combination with a nuclear power reactor having an elongated, coolant containing vessel provided with a dome at an upper end thereof, and a lower end through which an elongated sensor is inserted for monitoring power generated by a fuel core positioned within the vessel in spaced relation below the dome, the improvement comprising means projecting into the dome for protectively enclosing the sensor extended vertically into the dome from the fuel core, and means connected to the sensor for monitoring heat transfer conditions of coolant within the dome.

13. The improvement as defined in claim 12 wherein said sensor includes a gamma radiation heated body and a thermocouple device embedded therein, to which the monitoring means is connected for monitoring both the heat transfer conditions and power generated within the fuel core.

14. The improvement as defined in claim 13 wherein said protective enclosing means is provided with openings through which the sensor is externally exposed to coolant throughout within the dome.

15. The improvement as defined in claim 14 wherein said thermocouple device includes at least two spaced temperature measuring junctions connected to the monitoring means and located within the dome, one of said two junctions responding more rapidly to changes in heat flow through the heated body of the sensor than the other of the junctions, said faster responding one of the junctions being located vertically above the other of the junctions to produce a reversal in polarity of voltage across the junctions as measured by the monitorng means in response to depletion of the coolant to a level below said faster responding one of the junctions.

16. The improvement as defined in claim 12, wherein said sensor includes a gamma radiation heated body and a thermocouple device embedded therein having at least two spaced temperature measuring junctions connected to the monitoring means and located within the dome, one of said two junctions responding more rapidly to changes in heat flow through the heated body of the sensor than the other of the junctions, said faster responding one of the junctions being located vertically above the other of the junctions to produce a reversal in polarity of voltage across the junctions as measured by the monitoring means in response to depletion of the coolant to a level below said faster responding one of the junctions.

17. In a nuclear power reactor having a fuel core and sensor means positioned within a body of liquid coolant in thermal contact therewith, said sensor means including vertically spaced thermocouple junctions, the improvement residing in a liquid level monitor comprising means connected to said junctions for indicating a differential signal voltage therebetween in response to depletion of said body of liquid coolant below at least one of the junctions, heater means mounted adjacent to the sensor means for increasing said differential signal voltage to a triggering level, and alarm means connected to said indicating means for registering coolant loss in response to the differential signal voltage above said triggering level.

18. The combination of claim 18 wherein a differential voltage of opposite polarity is developed at said thermocouple junctions when the liquid coolant is in thermal contact with both of said junctions to monitor local power distribution.

19. In combination with a power distribution sensor for the fuel core of a nuclear power reactor having a body of coolant, the sensor including a gamma radiation heated body, in heat transfer relation to the coolant, within which a varying temperature distribution is established, thermoouple junctions mounted within the body at spaced locations, and monitoring means connected to said thermocouple junctions for measuring temperature differentials in the heated body reflecting localized power generation, the improvement comprising additional means connected to the thermocouple junctions for detecting changes in the temperature differentials caused by changes in relative coolant conditions at said spaced locations, and alarm means connected to the additional detecting means for indicating a drop in coolant level within the reactor.

* * * * *